United States Patent
Gastin

[15] 3,698,428
[45] Oct. 17, 1972

[54] VALVE ASSEMBLY
[72] Inventor: Darrell L. Gastin, Logan, Ohio
[73] Assignee: The Goodyear Tire & Rubber Company, Akron, Ohio
[22] Filed: March 22, 1971
[21] Appl. No.: 126,767

[52] U.S. Cl. ............................................. 137/595
[51] Int. Cl. ........................................... F16k 11/10
[58] Field of Search .............. 137/594, 595, 625.19

[56] References Cited

UNITED STATES PATENTS 3,098,506   7/1963   Spragens ............. 137/625.19

FOREIGN PATENTS OR APPLICATIONS 590,555   1/1960   Canada ..................... 137/595
768,429   2/1957   Great Britain ........ 137/625.19

*Primary Examiner*—Henry T. Klinksiek
*Attorney*—F. W. Brunner and J. D. Wolfe

[57] ABSTRACT

A valve assembly embodying a single actuator for two valve elements permitting positive opening and closing under actuation of the single actuator.

1 Claim, 3 Drawing Figures

PATENTED OCT 17 1972

3,698,428

INVENTOR.
DARRELL L. GASTIN
BY J. D. Wolfe
ATTORNEY

VALVE ASSEMBLY

This invention relates to a novel valve assembly of a type embodying a single actuator for two valve elements within a valve housing to control the flow of at least two components and characterized by dependability of operation, effective sealing and long life.

The valve assembly of the present invention is an improvement over conventional valves, for example, of the type used in mixing heads for foam blends, such as polyurethane. In one mixing head of this type, the valve assembly in one position of adjustment permits the separate components of the foam blend to be recirculated under pressure and in another position of adjustment directs the separate components to a mixing chamber within the head wherein the fluids are thoroughly blended by a blade-carrying rotor before the blend is discharged therefrom. This mixing head is described in detail in "Modern Plastics Encyclopedia Issue for 1959," Sept. 1958, beginning on page 335, and U.S. Pat. 3,098,506 issued July 23, 1963 in the name of George F. Spragens.

Although this valve assembly has achieved considerable success, it permits leakage of the reactive components and thus tends to stick and requires frequent maintenance.

The valve assembly of the present invention comprises a housing which accommodates a movable actuator therein which is capable of controlling the flow of a liquid or liquids through at least two different sets of ports. An effective seal is maintained between the movable actuator and the housing by a pair of deformable sleeves which serve both as effective bearings for the actuator and as effective seals between the actuator and the housing. These deformable sleeves are separated by a relatively rigid intermediate member and the effectiveness of the seal afforded by the deformable sleeves is controlled by means which apply axial forces against the outer edges of the deformable sleeves, compressing each of the deformable sleeves against the intermediate rigid member while still serving as effective bearings for the common actuator arrangement.

The valve assembly of the present invention also includes means for connecting the two deformable sleeves with the intermediate member as a unitary assembly and means to prevent rotation of this assembly within the housing to prevent the deformable sleeves from coming out of registry with the passages in the housing.

For a more complete understanding of the present invention, reference can be made to the detailed description which follows, and to the accompanying drawings.

Figure 1:
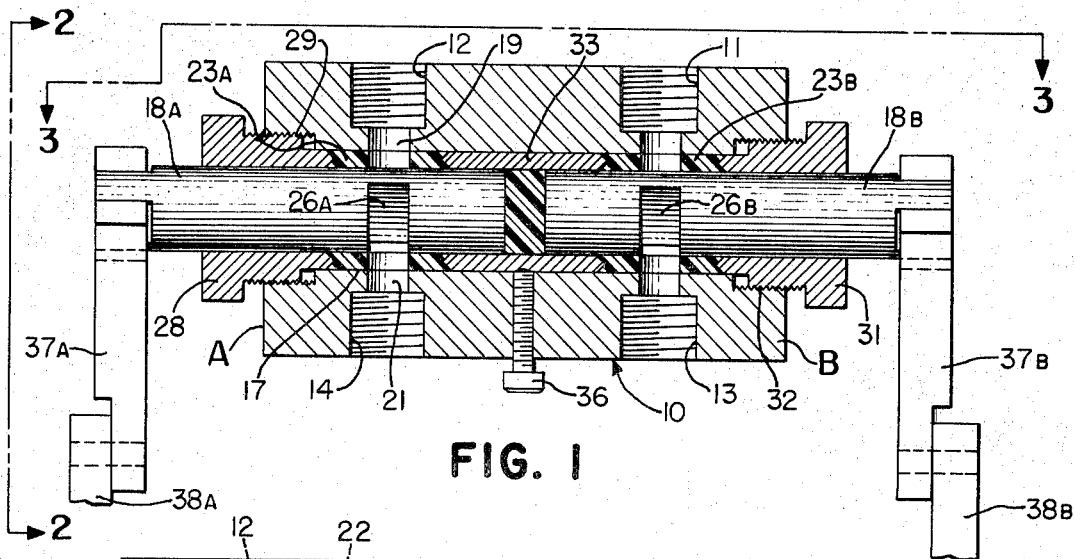
FIG. 1 is a view partly in section of a double three-way valve constructed in accordance with the principles of the invention.

Referring now to an illustrative embodiment of the invention as shown in the drawings, the numeral 10 refers to a housing which is relatively square in cross-section and of sufficient length to permit the location of spaced-apart threaded openings 11, 12, 13 and 14, to receive suitable fluid couplings, not shown. On the side of the housing 10 opposite from that viewed in FIG. 1, spaced-apart threaded openings 15 (FIG. 2) and 16 (not visible) are formed in the same circumferential plane with the openings 12 and 14, and 11 and 13, respectively. For convenience in the following description, the openings 12, 14 and 15 are associated with a first valve A and the openings 11, 13 and 16 are associated with a second valve B in the illustrative double valve arrangement shown in the drawings.

Figure 2:
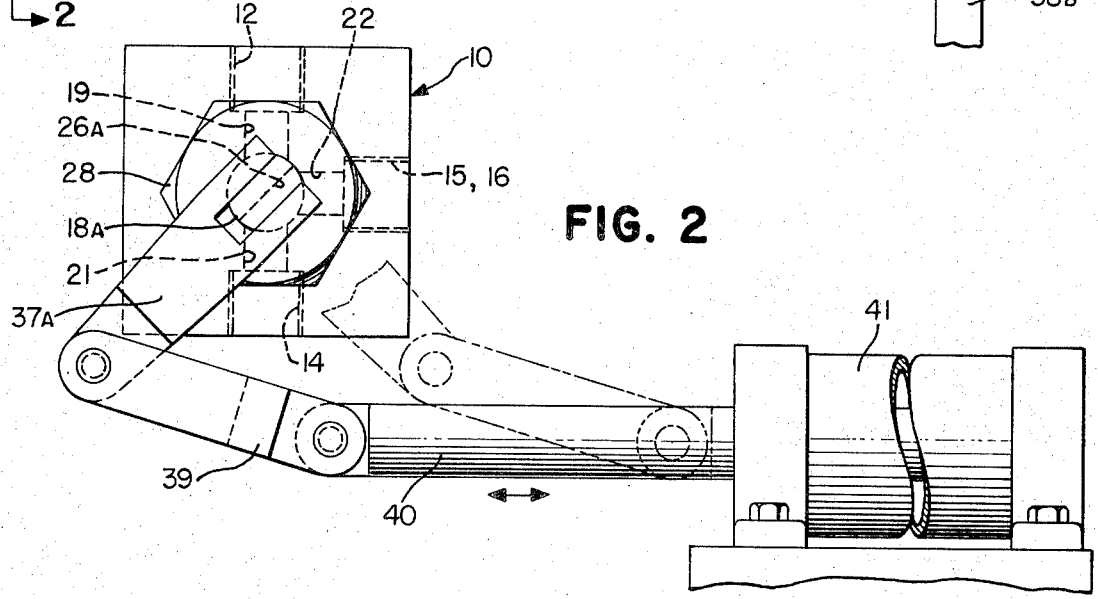
FIG. 2 is a cross-sectional view taken along the line 2—2 in FIG. 1.

A bore or channel 17 is formed axially through the housing 10, and a first valve element 18A and a second valve element 18B are positioned to be rotatable therein. Considering the first valve as identified above, an opening 19 communicates between the threaded opening 12 and the axial channel 17 and, similarly, an opening 21 communicates between the threaded opening 14 and the same axial channel 17. In addition, the openings 19 and 21 are in substantially axial alignment with each other. As seen in Fig. 2, a third opening 22 communicates between the threaded opening 15 and the axial channel 17. The axis of this opening 22 lies within the same plane as the axes of the openings 19 and 21.

The valve elements 18A and B are provided with a slot respectively identified as 26A and 26B, each one of which is in the same plane as the axes of the three openings 19, 21 and 22. Thus, as seen in Fig. 2, by rotating the valve element 18A, the slot 26A permits communication between selected openings, such as between the openings 19 and 22 in one position of the valve or as between the openings 21 and 22 in the position shown in FIG. 2.

Since the second valve embodying the openings 11, 13, and 16 is constructed in the same manner as the first valve described above, a further detailed description of the second valve is deemed to be unnecessary. In other words, the second valve may be viewed as a right-hand arrangement of the first valve within the bore or channel 17 of the housing 10.

To provide an effective seal in accordance with the invention, identical sleeves 23A and 23B of suitable material having a relatively low coefficient of friction when in the dry state are positioned about the respective valve elements 18A and B within the axial channel 17. These sealing sleeves are an important feature of the valve assembly and are constructed of a material which has certain desired properties. The sleeve material is essentially a solid in the temperature ranges which are normally encountered, and also the material is substantially chemically inert to the fluids which are to be sealed off. Although essentially a solid the sleeves 23A and B are yieldable or plastically deformable whereby an axial pressure against the ends of each sleeve will urge the sleeve into tight sealing engagement between the valve elements 18A and B and the axial channel 17. Furthermore, with sleeves of this material it is not necessary to employ lubricants such as grease or oil to maintain the seal while permitting free movement of the valve elements 18A and B within the sleeves.

It has been found that a material such as "Teflon" is particularly well suited for the sleeves described above. "Teflon" is a trademark applied to the polymers of tetrafluoroethylene. This material remains solid over an appreciably wide range of temperatures. However, it should be understood that the present invention is not limited to this particular material, any plastically deformable material having a relatively low coefficient of friction being suitable to substitute for "Teflon."

A significant feature of a valve mechanism of this type is a structural arrangement whereby the plastically deformable sleeve functions more efficiently as a valve packing material. To assist in the accomplishment of this desired result, a groove is provided in each end of the sleeves. Threaded plugs 28 and 31 are adapted to fit within the threaded openings 29 and 32, respectively, in opposite ends of the axial channel 17. Each of these plugs 28 and 31 is provided with a circular portion extending ahead of each plug and formed to fit within the respective grooves in each sleeve. By this arrangement, the two plugs 28 and 31 are tightened to apply an axial force on the sleeve.

A metallic sleeve 33 is interposed between the deformable sleeves 23A and 23B. The opposite ends of the metallic sleeve 33 are formed to preferably fit the respective grooves in the deformable sleeves 23A and 23B, as best seen in FIG. 1. Relative movement between the adjacent sleeves is prevented by a threaded bolt 36, which passes through the housing 10 and engages the metallic sleeve 33, prevents rotational movement of the valve packing assembly, that is, the connected sleeves 23A, 33 and 23B. It is important to prevent rotation of these sleeves since each sleeve, for example, sleeves 23A and B, has openings for matching with the openings 19 and 22, respectively.

The housing 10 may be formed of any suitable material, and a specific example of a suitable material, for illustrative purposes, is anodized aluminum. The axial channel 17, in one embodiment of the assembly, measures seven-eighths inch in diameter, and in this specific assembly, the "Teflon" sleeve is provided with a seven-eighths inch outside diameter and a five-eighths inch inside diameter. The valve elements 18A and B are formed of steel and measure five-eighths inch in diameter. Of course, it is understood that these particular dimensions are merely illustrative and are in no way limiting. Valve packing assemblies of any desired dimensions may be made in accordance with the principles of the invention.

Figure 3:
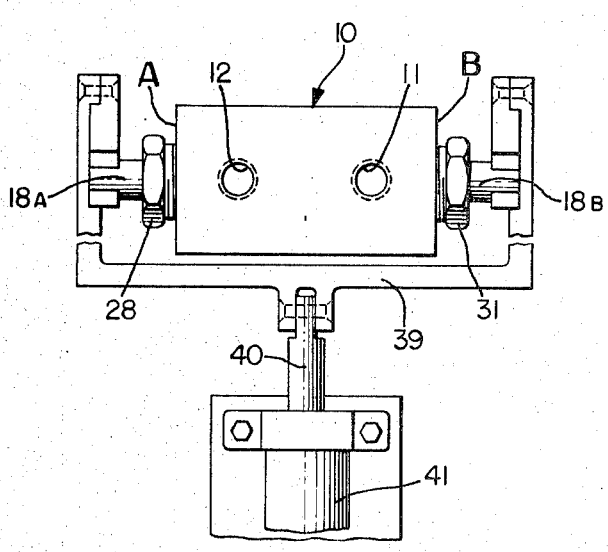
FIG. 3 is a plan view of the movable valve element shown in the arrangement in FIG. 1.

Having described the valve assembly, the mechanism for rotation of valve elements 18A and B simultaneously is best seen by reference to the drawings. For instance, FIG. 1 shows valve elements 18A and B extend beyond housing 10 and has arms 37A and B positioned thereon. FIGS. 2 and 3 show arms 37A and B connected pivotably to links 38A and B respectively. Links 38A and B respectively are the terminal ends of bifurcated member 39 which is attached to piston 40 of the hydraulic cylinder 41 or a solenoid 41. Actuation of the piston causes movement of piston 40 and consequently rotation of valve elements 18A and B. Thus the rotation of elements 18A and B positions slots 26A and B respectively in fluid communication with the desired pair of threaded openings, for instance, 12 and 14 in valve A and 11 and 13 in valve B.

The operation of the hydraulic cylinder or solenoid can be actuated either manually or by timers to give the desired cycle of valve openings and closings to thereby positively control the feeding of the desired liquids to the desired place.

What is claimed is:

1. In a sealed valve assembly comprising a valve housing two sets of spaced-apart valve ports formed in the housing and having an axial cylindrical passage to accommodate rotatable cylindrical valve elements for cooperative opening and closing action with the respective valve part, each of the rotatable cylindrical valve elements extending beyond the housing and having a nonrotatable seal between the valve element and the housing, the improvement comprising placing a solid seal of a relatively tough, slippery, semi-rigid, but relatively resilient seal element of polymer of tetrafluoroethylene in the passage between the valve elements, and connecting the ends of the valve elements outside the housing with a pivotable linkage to a bifurcated elongated member, said bifurcated elongated member having connection to a means to move the bifurcated elongated member to effect rotation of the valve elements.

* * * * *